(12) United States Patent
Yao (10) Patent No.: US 11,153,151 B2
(45) Date of Patent: Oct. 19, 2021

(54) CENTRALIZED SELF-HEALING UPDATE AND FIX OF NETWORK DEVICE CONFIGURATION

(71) Applicant: DISH Network L.L.C., Englewood, CO (US)

(72) Inventor: Kevin Yao, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/814,014

(22) Filed: Mar. 10, 2020

(65) Prior Publication Data

US 2021/0288868 A1 Sep. 16, 2021

(51) Int. Cl.
*H04L 12/24* (2006.01)

(52) U.S. Cl.
CPC ...... *H04L 41/0672* (2013.01); *H04L 41/0873* (2013.01)

(58) Field of Classification Search
CPC .............. H04L 41/0672; H04L 41/0873
USPC ......................................... 709/221
See application file for complete search history.

(56) References Cited

U.S. PATENT DOCUMENTS

| | | | | |
|---|---|---|---|---|
| 8,301,767 | B1* | 10/2012 | Davis | H04L 63/102 709/225 |
| 9,378,461 | B1 | 6/2016 | Chatterjee et al. | |
| 9,542,177 | B1 | 1/2017 | Johansson et al. | |
| 9,721,112 | B2* | 8/2017 | Tse | G06F 21/6218 |
| 9,906,559 | B2* | 2/2018 | Cudak | H04L 67/1008 |
| 10,079,724 | B2* | 9/2018 | Baukes | H04L 41/0816 |
| 10,187,425 | B2* | 1/2019 | Stuntebeck | H04L 63/102 |
| 10,432,672 | B2* | 10/2019 | Murthy | G06F 21/6218 |
| 10,581,861 | B2* | 3/2020 | Bai | H04L 63/20 |
| 10,826,771 | B2* | 11/2020 | Garrett, Jr. | H04L 41/0672 |
| 2017/0118591 | A1* | 4/2017 | Fournier | H04W 4/029 |
| 2017/0126647 | A1* | 5/2017 | Zhang | H04L 63/08 |
| 2017/0126834 | A1 | 5/2017 | Fransen | |
| 2020/0302018 | A1* | 9/2020 | Turkkan | G06F 16/3347 |

FOREIGN PATENT DOCUMENTS

EP 2545446 A2 1/2013

OTHER PUBLICATIONS

International Search Report and Written Opinion for PCT/US2021/021492 dated Jun. 18, 2021, all pages.

* cited by examiner

*Primary Examiner* — David P Zarka (74) *Attorney, Agent, or Firm* — Kilpatrick Townsend & Stockton (57) ABSTRACT

Techniques are described for centrally directed self-healing of networked devices. Large numbers of networked devices can be configured according to configuration data. A central management system (CMS) can group the devices into device swarms having identical nominal device configurations. The CMS can determine a swarm-agreed configuration state for each device swarm that corresponds to a determined "correct" configuration for devices in the device swarm. Over time, the devices send configuration fingerprints to the CMS to indicate their current configuration states, and the CMS can analyze the current configuration states against the swarm-agreed configurations to detect potential configuration issues. In response, the CMS can automatically direct remedying of the detected configuration issues in accordance with the swarm-agreed configurations.

20 Claims, 5 Drawing Sheets

CENTRALIZED SELF-HEALING UPDATE AND FIX OF NETWORK DEVICE CONFIGURATION

FIELD

This invention relates generally to self-healing of networked devices, and, more particularly, to automatically identifying and repairing firmware and/or configuration issues in networked devices using centralized monitoring.

BACKGROUND

Advances in communications networks and networked devices have led to a mass proliferation of devices having different functions and different levels of complexity. For example, deployment of so-called "fifth generation," or 5G, communication networks is facilitating interactions among billions of networked devices. Some networked devices are relatively simple, having limited functionality and basic connectivity to an IoT network. Some examples of such relatively simple devices include certain "smart" home appliances (e.g., smart doorbells, smart refrigerators, smart thermostats, etc.), networked parking lot sensors, networked greenhouse sensors, networked security system devices, other Internet-of-Things (IoT) sensor and/or actuator devices, etc. Other networked devices can be relatively complex, such as baseband units (BBUs), edge compute nodes, and the like. For example, certain processing functions can be partially centralized using edge computing; any of the simpler networked devices can tend to communicate with one or more edge compute nodes (e.g., a gateway, router, etc.), so that data from relatively unsophisticated IoT end devices can be gathered and processed using the relatively sophisticated capabilities of the edge compute nodes.

Typically, operation of such networked devices is directed by the devices configuration, which can be defined by the device's firmware and/or configuration ("config") files. The firmware can include low-level programming for hardware in a networked device to direct how the hardware acts, and interacts with other hardware. The config files can include various global settings for controlling operation of devices functions. In some cases, the config files can also include customizable configuration settings, such as to facilitate personalized setup of certain device functions.

Over time, issues can arise with a device's configuration, causing the device to fail, misbehave, or be outdated. For example, configuration data (e.g., firmware or config code) can become corrupted or hacked, or certain updates or fixes to configuration data can be inconsistently and/or unsuccessfully applied to devices. In such cases, it can be desirable to detect and repair the devices. However, a number of factors make automatic detection and repair impractical. Some such factors include that many such networks have very large numbers (e.g., thousands or millions) of devices, that the large numbers of devices are often distributed over large geographic areas and large numbers of private networks, that the devices are often deployed by end users with limited technical knowledge and/or information, etc.

BRIEF SUMMARY

Among other things, embodiments provide novel systems and methods for centrally directed self-healing of networked devices. Some embodiments operate in context of large networks with large numbers (e.g., many thousands or more) of networked devices, each configured according to configuration data, such as firmware and/or configuration files. A central management system (CMS) groups the devices into device swarms, so that each device swarm corresponds to a population of devices having identical nominal device configurations. The CMS can determine a swarm-agreed configuration state for each device swarm that corresponds to a determined "correct" configuration for devices in the device swarm. The networked devices can periodically (or otherwise) send configuration fingerprints (e.g., a hash of the device's firmware, lines of code from the device's configuration, etc.) to indicate the devices' current configuration states. The CMS can analyze the current configuration against the swarm-agreed configuration to detect discrepancies as indicating a potential configuration issue. The CMS can automatically direct remedying of the detected configuration issue, such as by forcing reboots and/or configuration roll-backs, and/or by forcing configuration updates in accordance with the swarm-agreed configurations.

According to one set of embodiments, a centralized monitoring system (CMS) for self-healing of networked devices is provided. The CMS includes: a device interface subsystem, a swarm data store, a swarm analyzer, and a self-healing subsystem. The device interface subsystem is to communicatively couple with a plurality of networked devices via one or more communication networks, the device interface configured to receive a particular configuration fingerprint by a centralized monitoring system (CMS) from a particular networked device of the plurality of networked devices, the particular configuration fingerprint indicating a particular current configuration state for the particular networked device, the particular networked device associated with a particular nominal device configuration. The swarm data store has, stored thereon in association with each of a plurality of device swarms, a respective population of the networked devices determined to have a same respective nominal device configuration associated with the device swarm, and a respective swarm-agreed configuration determined to be a correct configuration state for the same respective nominal device configuration associated with the device swarm. The swarm analyzer is configured to: associate the particular configuration fingerprint with a particular device swarm of the plurality of device swarms according to matching the particular nominal device configuration to the respective nominal device configuration for the particular device swarm; and detect a device configuration issue by detecting a discrepancy between the particular current configuration state of the particular networked device and a particular swarm-agreed configuration being the respective swarm-agreed configuration associated with the particular device swarm. The self-healing subsystem is configured, responsive to the detecting the device configuration issue, to direct self-healing of the particular networked device in accordance with applying the swarm-agreed configuration.

According to another set of embodiments, a method is provided for centralized self-healing of networked devices. The method includes: receiving a particular configuration fingerprint by a centralized monitoring system (CMS) from a particular networked device of a plurality of networked devices in communication with the CMS via one or more communication networks, the particular configuration fingerprint indicating a particular current configuration state for the particular networked device, the particular networked device associated with a particular nominal device configuration; associating the particular configuration fingerprint with a particular device swarm of a plurality of device swarms according to the particular nominal device configuration, each device swarm corresponding to a respective population of the networked devices determined to have a same respective nominal device configuration; detecting, by the CMS, a device configuration issue by detecting a discrepancy between the particular configuration fingerprint and a particular swarm-agreed configuration associated with the particular nominal device configuration, the swarm-agreed configuration generated by determining, for each device swarm, a respective swarm-agreed configuration associated with the same respective nominal device configuration for the device swarm, the particular swarm-agreed configuration being the respective swarm-agreed configuration determined for the particular device swarm; and directing, by the CMS responsive to the detecting, self-healing of the particular networked device in accordance with applying the swarm-agreed configuration.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
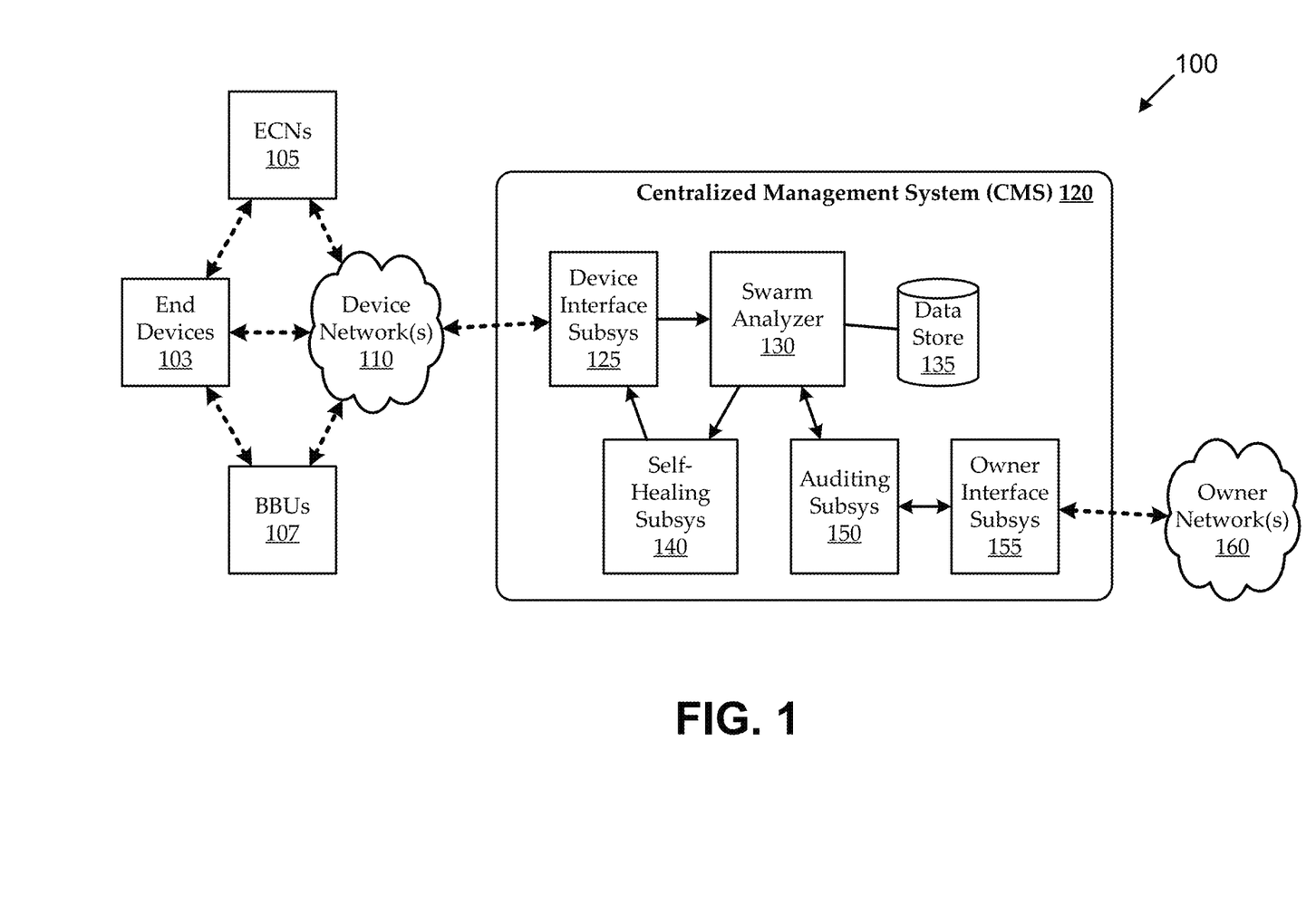
FIG. 1 shows a network environment as a context for various embodiments.

Turning to FIG. 1, a network environment 100 is shown as a context for various embodiments. The network environment 100 includes a number of networked devices coupled with a centralized management system (CMS) 120 via one or more device networks 110. In some implementations, the number of networked devices includes hundreds, thousands, or more devices of various types, the devices being part of many different public and/or private networks. For example, deployment of so-called "fifth generation," or 5G, communication networks is facilitating interactions among billions of networked devices, ranging from very simple devices (e.g., with only one, or a small number, of functions, and network connectivity) to very complex devices. Some such networked devices are end devices 103, such as "smart" home appliances (e.g., smart doorbells, smart refrigerators, smart thermostats, etc.), networked parking lot sensors, networked greenhouse sensors, networked security system devices, other Internet-of-Things (IoT) sensor and/or actuator devices, etc. Other networked devices, such as baseband units (BBUs) 107, edge compute nodes 105, and/or other such devices can be implemented in intermediate nodes, hubs, or other portions of networks (e.g., in routers or gateways). As described herein, embodiments of the CMS 120 can interact with the different types of networked devices in different ways, such as depending on the complexity of the networked device.

Embodiments of the devices network(s) 110 can include any type of wired or wireless network, or combination thereof, such as a cable network, wireline network, optical fiber network, telecommunications network, intranet, Internet, local area network (LAN), wide area network (WAN), wireless local area network (WLAN), metropolitan area network (MAN), public telephone switched network (PSTN), Bluetooth network, ZigBee network, near field communication (NFC) network, or the like. The device network(s) 110 can include any suitable number and type of secure links, unsecure links, wired links, wireless links, public links, private links, etc. Various of the networked devices can be coupled with the CMS 120 and/or with each other via any suitable number and type of network access points, such as wired or wireless network access points (e.g., base stations and/or internet exchange points), in accordance with any suitable one or more architectures (e.g., hub and spoke, mesh, etc.).

In some embodiments, the networked devices and device network(s) 110 implement one or more Internet of Things (IoT) networks. Such IoT networks can include any suitable network of physical devices, buildings, vehicles, and other objects that feature internet identifiers (e.g., IP addresses, media access control (MAC) addresses, service set identifiers (SSIDs), etc.) for connectivity and data exchange. IoT devices in such a network can generally include hardware and/or software to facilitate particular device functions (e.g., as IoT sensor devices and/or IoT actuator (e.g., controller) devices), and hardware and/or software to facilitate network functionality (e.g., transceivers, antennas, protocols, etc.). The IoT network can be implemented using narrow-band or wider bands, including, for example, transceivers and/or other interfaces for wireless fidelity (WiFi) and/or WiFi-Direct, Bluetooth and/or Bluetooth Low Energy (BLE), Zigbee, Ultra-Wideband (UWB), etc.

The networked devices operate, at least in part, according to configuration data. In some networked devices, the configuration data is implemented as firmware. The firmware can include low-level programming for hardware in the networked device to direct how the hardware acts, and how the hardware interacts with other hardware (e.g., of other devices). In some networked devices, the configuration data is implemented as one or more configuration ("config") files. The config files can include various global settings for controlling operation of devices functions, referred to herein as "global config." In some cases, the config files can also include customizable configuration settings, such as to facilitate personalized setup of certain device functions, referred to herein as "personalized config." Typically, at least some portion of the configuration data for a networked device is pre-loaded on the networked device, so that the networked device can begin to function when it is installed and activated. For example, when a new smart appliance is installed and turned on, the appliance can begin performing various functions, such as searching for network connectivity, based on the pre-loaded firmware and/or config files.

Over time, configuration files are often updated by device owners, such as a device manufacturer. For example, a device may occasionally check for updates to its firmware, or updates may occasionally be pushed to devices by the device owners. As used herein, a device "owner" can be any individual or entity with authority and/or responsibility over configuration of a networked device. In some contexts, a networked device may be used by an end customer with specialized knowledge, access, and authorization to affect configuration of the networked device, such that the end consumer acts as the device owner. For example, an edge compute node 105 may be installed and maintained by information technology (IT) personnel of a business, and the IT personnel can access the edge compute node 105 for maintenance, troubleshooting, updating, repair, etc. In many other contexts, an end consumer does not have the technical knowledge and/or may not be provided with technical access to affect the firmware, global config, and/or other non-personalized portions of configuration data for a networked device. As such, updates and/or repairs to configuration data may be outside the purview of the end consumer, and the device owner can be considered herein as the company from which the device was purchased, or the like (e.g., even if that company does not legally own the device).

Whether because of updates, errors, or other reasons, issues can arise over time with a device's configuration, causing the device to fail, misbehave, or be in an undesired state. For example, configuration data can become corrupted or hacked, or certain updates or fixes to configuration data can be inconsistently and/or unsuccessfully applied to devices. In such cases, it can be desirable to detect and repair the devices. However, a number of factors make automatic detection and repair impractical. Some such factors include that many such networks have very large numbers (e.g., thousands or millions) of devices, that the large numbers of devices are often distributed over large geographic areas and large numbers of private networks, that the devices are often deployed by end users with limited technical knowledge and/or information, that the devices are owned by many different entities, etc.

As described herein, embodiments of the CMS 120 seek to provide self-healing of configuration data for networked devices, including automated detection and repair of configuration issues. Embodiments of the CMS 120 include a device interface subsystem 125, a swarm analyzer 130, a swarm data store 135, and a self-healing subsystem 140. Embodiments of the device interface subsystem 125 provide an interface between the CMS 120 and the one or more device networks 110, and thereby to the networked devices (e.g., including the end devices 103, the edge compute nodes 105, and the BBUs 107). The device interface subsystem 125 can receive configuration fingerprints from the networked devices. As described herein, each configuration fingerprint indicates a particular current configuration state for the networked device associated with the configuration fingerprint. In some embodiments, the networked devices transmit the configuration fingerprints periodically (e.g., according to a defined frequency, such as once per week). In other embodiments, the networked devices transmit the configuration fingerprints responsive to a request for the configuration fingerprints issued by the CMS 120. In other embodiments, the networked devices transmit the configuration fingerprints responsive to detecting a trigger condition, such as detecting an operating error. For example, some of the networked devices (e.g., BBUs 107, edge compute nodes 105, and end devices 103 having more complex processing capabilities) can detect and/or report (e.g., log) certain issues or conditions, such as reporting that the device is stuck in a loop, that the device was forced to restart, that power was disconnected from and reconnected to the device, that a peripheral device was coupled with the device, that configuration files were accessed, etc. In some implementations, in response to detecting some such conditions, a networked device can be configured automatically to send a configuration fingerprint to the CMS 120. In other implementations, in response to detecting some such conditions, a networked device can be configured automatically to send a log or report to the CMS 120 (or other suitable system) to report the condition; and, where appropriate, the networked device may receive instructions in response thereto directing the networked device to send a configuration fingerprint.

Each networked device is associated with a nominal device configuration. As used herein, the term "nominal" is intended to refer to what is technically expected. For example, a 5-volt battery has a nominal voltage of 5 volts, even if it actually has a measured voltage of 4.9 volts, or the like. In context of a particular network device's configuration, the nominal device configuration refers to the device configuration that is expected for the particular networked device by the device's owner in accordance with identifiers for the device. A particular networked device can be identified by a particular device make and/or device model, and can be configured according to a particular version of configuration data (e.g., factory default firmware version), all corresponding to the nominal device configuration for the particular networked device. When an end consumer installs the networked device, the device can establish network connectivity (e.g., with the consumer's home wireless LAN), obtain an IP address, and/or otherwise become a logically identifiable part of a device network 110. At that stage, the nominal device configuration can be a default configuration known or assumed to be pre-loaded on the networked device as sold to the end consumer. Once connected, the networked device can begin operating, look for updated configuration data, contact a device owner network, and/or perform any other suitable tasks in accordance with its firmware, config files, and/or other configuration data. If the device configuration is updated or otherwise modified at that stage, or in any subsequent stage, the nominal device configuration can be likewise updated to reflect the new expected configuration for the networked device. In some implementations, the nominal device configuration is maintained by the networked device itself. In other implementations, the nominal device configuration is maintained by the CMS 120. In other implementations, the nominal device configurations of networked devices can be maintained in multiple locations.

As noted above, the device interface subsystem 125 can receive configuration fingerprints that indicate particular current configuration states for the networked devices. The configuration fingerprints can be implemented in any suitable manner that facilitates detection of a device configuration state that is undesired and/or unintended by the device owner. In some implementations, the configuration fingerprint is generated by applying a mathematical function to some or all of the configuration data for a device. For example, a cryptographic hash is a one-way function that can take data of arbitrary length and output a string of bytes having a fixed length. Thus, each configuration fingerprint can be the output of the hash function, or other function, such as a checksum, hash value, message digest, or the like. In other implementations, the configuration fingerprint includes one or more lines of code. For example, the configuration fingerprint can include some or all of one or more config files, or the like. The configuration fingerprints may be generated in the same or different ways, depending on the device. For example, devices with firmware configurations can generate their configuration fingerprints by generating a cryptographic hash of the firmware, while devices with config files can generate their configuration fingerprints by encrypting some or all code lines of their global config files. In some implementations, the configuration fingerprints include additional information. For example, the configuration fingerprints can include device identifiers (e.g., a make or model of the device, an IP address of the device, a serial number of the device, a MAC address of the device, etc.), an identifier for the nominal device configuration (e.g., the version number of the last installed firmware), a timestamp (e.g., a current timestamp associated with the current configuration, a time value since the last communication of a configuration fingerprint, etc.), and/or any other suitable information. In some implementations, such additional information is included as part of the same configuration fingerprint (e.g., part of the hash, part of the transmitted data, etc.). In other implementations, such additional information is communicated separately.

If nominal device configurations are maintained and updated properly to reflect all intended changes to device configurations, configuration fingerprints can be expected to match a recorded nominal device configuration for any particular device. As such, any mismatch between the configuration fingerprints and the nominal device configurations can indicate an unintended and/or undesired configuration state. For example, if a device's firmware becomes corrupted, hacked, or otherwise changed in a manner not intended by the device owner, the configuration fingerprint transmitted by the device will not match the nominal device configuration for the device.

Embodiments of the CMS 120 receive large number of configuration fingerprints for large numbers of networked devices across the one or more device network(s) 110. The configuration fingerprints can be received via the device interface subsystem 125 and passed to the swarm analyzer 130. Embodiments of the swarm analyzer 130 perform various categories of functions. One category of functions involves using configuration fingerprints and/or other information to group networked devices into device swarms, and to determine a correct device configuration for each device swarm. Another category of functions involves using the configuration fingerprints to detect whether any particular networked device is experiencing a device configuration issue by determining any discrepancies between a device's current configuration state (according to its configuration fingerprint) and the determined correct configuration for the device swarm assigned to the networked device.

As described herein, configuration fingerprints and other information (e.g., asserted configurations, etc.) is received by the CMS 120, and other information (e.g., device swarm listings, swarm-agreed configurations) is generated by the CMS 120. Some or all such data can be maintained and updated in the swarm data store 135. In some embodiments, the swarm data store 135 includes listings of device swarms, including registries of all device identifiers already associated with the device swarm. In some implementations, the CMS 120 can become aware of any particular networked device when it first communicates with the CMS 120. For example, as part of the device establishing network connectivity, the device can find the CMS 120 (e.g., using domain name system (DNS) techniques, or the like) via the device network(s) 110, and can exchange relevant information, such as the IP address and/or other device identifiers (e.g., physical and/or logical). The swarm analyzer 130 can then determine the nominal device configuration for the device, based on the device identifiers, based on an initial configuration fingerprint, or in any suitable manner. The determined nominal device configuration can be used to assign the networked device to a device swarm of comparable devices, and the swarm data store 135 can store the device identifiers in association with an identifier for the device swarm. The swarm data store 135 can also store swarm-agreed configurations for the device swarms, and/or any other suitable information.

In the event that the swarm analyzer 130 detects a device configuration issue for a particular networked device, embodiments of the self-healing subsystem 140 can direct remedying of the issue. The remedying can be directed in various ways. In some embodiments, the self-healing subsystem 140 communicates to the networked device the determined correct configuration for the device swarm assigned to the networked device, and the networked device can be directed to replace the existing configuration data with the determined correct configuration. For example, the networked device can be directed to update its firmware by loading new firmware according to the determined correct configuration, to overwrite its global config file(s) and execute new config files according to the determined correct configuration, etc. In other embodiments, the self-healing subsystem 140 can try one or more other remedial approaches prior to updating overwriting the device's configuration state. In some such embodiments, the self-healing subsystem 140 directs the networked device to force a reboot. After the reboot, the networked device can be directed further to send another configuration fingerprint, to run a self-check diagnosis routine, or otherwise to determine whether the same condition and/or same configuration state discrepancy persists after the reboot. In other such embodiments, the self-healing subsystem 140 can direct the networked device to roll back to a previous state known to be stable. For example, if the networked device has recently been updated or otherwise had a configuration change, the self-healing subsystem 140 can force a roll-back to a state prior to that configuration change, where possible.

In some embodiments, operations of the self-healing subsystem 140 are impacted by an auditing subsystem 150. For example, embodiments of the self-healing subsystem 140 detect a particular configuration issue for a particular networked device, as described above. Responsive to such detection, embodiments of the auditing subsystem 150 can analyze the determined configuration issue to further determine whether this is an issue that should be addressed by the CMS 120. As one example, the auditing subsystem 150 determines that the same issue has already been detected multiple times previously, and the CMS 120 has already attempted to address the issue multiple times previously, apparently unsuccessfully. As another example, the auditing subsystem 150 determines that the networked device is part of a swarm of devices that are in the process of receiving firmware updates (e.g., pushed by the device owner), such that discrepancies are expected over a period of time and do not necessarily indicate a concern. As another example, the auditing subsystem 150 determines that the same detected configuration issue has not previously been detected in the particular networked device, but has been detected previously in one or more other networked devices in the same device swarm. These and other types of detections can be performed in different ways by the auditing subsystem 150. In some implementations, the auditing subsystem 150 includes a state machine, or the like. Such implementations can detect relatively simple cases that have been preprogrammed into the machine, such as whether a same event has occurred a certain number of times. In other implementations, the auditing subsystem 150 includes an artificial intelligence engine configured to exploit machine learning. Such a machine learning engine can detect more complex cases that may or may not have been predicted. For example, the machine learning can discover over time that devices of a certain type tend to exhibit certain configuration issues under certain conditions, that multiple different devices in a particular geographical region have apparently begun to show similar types of configuration issues in a similar time period (e.g., which may indicate hacking, a software virus, etc.), or other such patterns.

Depending on the audit results, the auditing subsystem 150 can perform different actions. In some instances, the auditing subsystem 150 determines that the detected configuration issue is something to be addressed, and the auditing subsystem 150 can direct the self-healing subsystem 140 to proceed with directing remedying of the networked device. In other instances, the auditing subsystem 150 determines that authorization is needed from the device owner prior to proceeding with self-healing. In such cases, the auditing subsystem 150 can transmit an authorization request to the device owner that indicates the configuration issue, device identifiers, and/or any other suitable information; and can receive an authorization response from the device owner with an approval or denial of authorization to proceed. In response to receiving approval, the auditing subsystem 150 can direct the self-healing subsystem 140 to proceed with directing remedying of the networked device (e.g., the self-healing subsystem 140 may only proceed with authorization in cases where authorization is determined to be needed). For example, the self-healing subsystem 140 can direct certain remedial actions (e.g., forced reboot, etc.) without authorization, but can only direct other remedial actions (e.g., forced updating of firmware) with authorization.

As illustrated, embodiments of the CMS 120 can include an owner interface subsystem 155 that provides an interface between the CMS 120 and one or more owner networks 160. One or more owner devices (e.g., remote servers, cloud-based systems, etc.) can receive communications from, and/or transmit communications to, the CMS 120 via the owner networks 160 and the owner interface subsystem 155. For example, the authorization request and response described with reference to the auditing subsystem 150 can be communicated via the owner interface subsystem 155 and the owner networks 160. The owner interface subsystem 155 can be used to support other features described herein. In some embodiments, device owners can request, via the owner interface subsystem 155, current configuration states from one or more networked devices, determined correct configuration states for one or more device swarms, and/or other information. The CMS 120 can generate responses to such requests using its locally stored information (e.g., from the swarm data store 135), by directing one or more networked devices to provide information (e.g., to provide configuration fingerprints), etc. In other embodiments, device owners can push configuration changes to networked devices via the owner interface subsystem 155. For example, the device owners can use the CMS 120 (via the owner interface subsystem 155) to push out firmware updates, software updates, etc. In other embodiments, the owner interface subsystem 155 can be used by the CMS 120 to output diagnostic information, periodic reports, etc. For example, device owners may desire to know how devices are being grouped into device swarms, how many devices are in certain device swarms, what configuration states have been determined for different device swarms, numbers and/or types of configuration issues that have been detected for different device swarms, etc.

Figure 2:
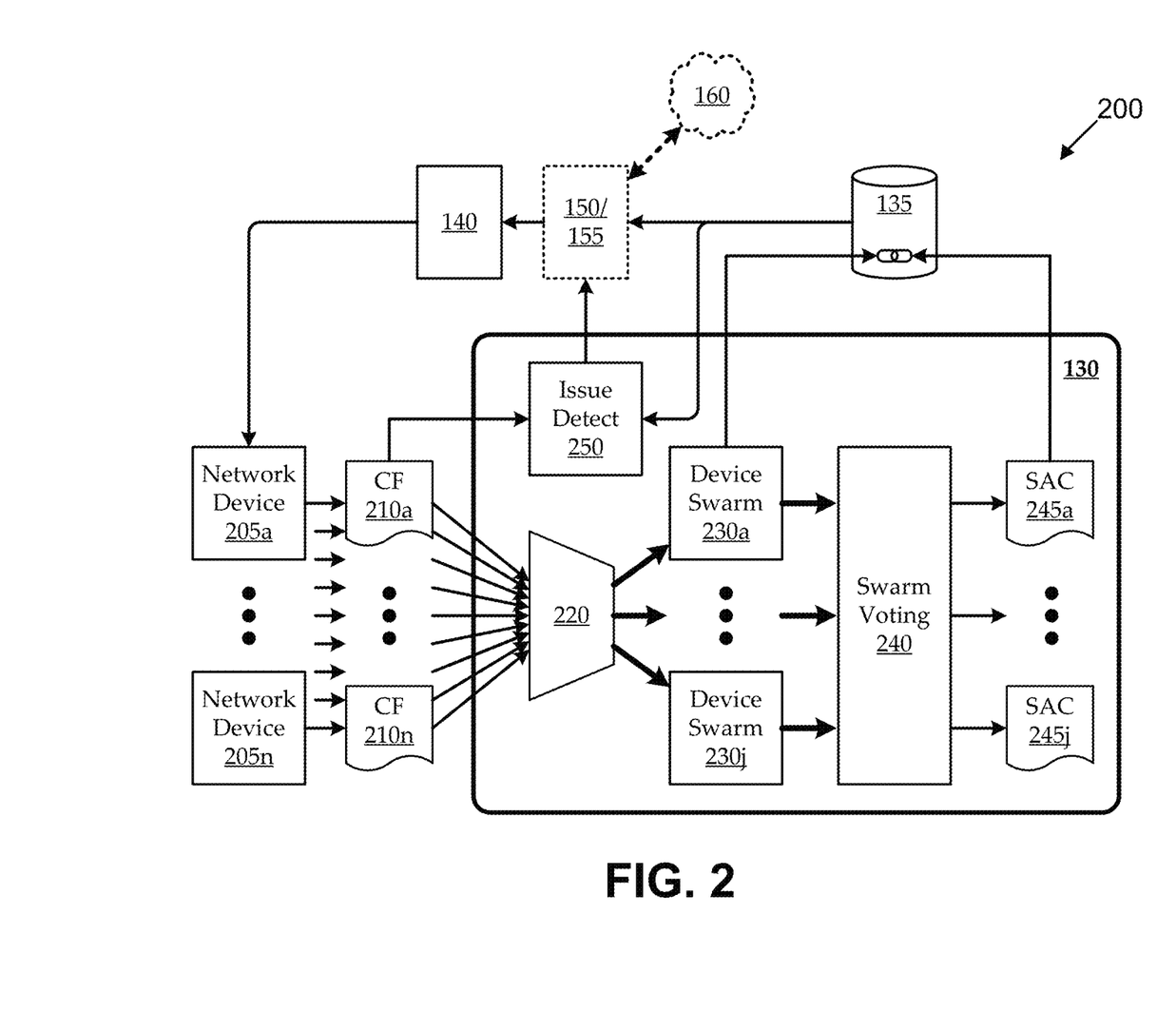
FIG. 2 shows a simplified partial communication environment to illustrate determination and use of device swarm configurations according to a swarm-agreed configuration approach, according to various embodiments.

As described above, embodiments of the swarm analyzer 130 assign networked devices into device swarms, use the device swarms to determine correct configuration states for networked devices, and detect when a particular networked device has a current state that fails to match the determined correct state for its device swarm. FIG. 2 shows a simplified partial communication environment 200 to illustrate determination and use of device swarm configurations according to a swarm-agreed configuration approach, according to various embodiments. As illustrated, a number of networked devices 205a-205n are in communication with a swarm analyzer 130. As described with reference to FIG. 1, though not explicitly shown, the swarm analyzer 130 can be part of a CMS 120, and the communication can be via one or more device networks 110 and a device interface subsystem 125. The networked devices 205 communicate configuration fingerprints 210 and/or other information (e.g., one or more device identifiers) to a discriminator 220 of the swarm analyzer 130. The discriminator 220 uses the received information to assign the networked devices 205 to device swarms 230. Notably, there are likely many more networked devices 205 than device swarms 230.

The networked devices 205 can be grouped in any suitable manner that results in a population having sufficiently identical nominal device configurations to be useful for detecting discrepancies. In some implementations, each device swarm 230 has only networked devices 205 with identical nominal device configurations (e.g., the same version of the same firmware, etc.). In some cases, devices with identical nominal device configurations will also be devices of identical type (e.g., same make, model, etc.). However, cases can arise in which different devices (e.g., devices with different aesthetics, different groups of sub-devices, etc.) can still be identical in at least the portion of their configuration used for the device swarm assignment. In some embodiments, the assignment of networked devices 205 to device swarms 230 can account for additional information. As described herein, some functionality involves voting, or other such processes; and such processes can benefit from using a device population of at least a minimum size. However, performing certain processing with device populations that are too large can consume undesirable amounts of processing resources, time, etc. As such, device swarms 230 can be assigned in a manner that controls the population size. In some implementations, the CMS 120 effectively forms device sub-networks in the device networks 110 for improved device assignment. For example, suppose a company owns multiple parking lots distributed over a few blocks of a downtown metropolitan area. Each parking lot uses a parking sensor at each parking space, so that there are thousands of nominally identical parking sensors distributed over a relatively small geographical area. In such a case, a relatively small portion of a communication network (e.g., a small number of network routing nodes, etc.) may be sufficient to cover a large enough number of parking sensor devices to facilitate voting and/or other processes. As another example, suppose a company sells a model of smart refrigerator. As only a relatively small number of consumers is likely to own that particular refrigerator, and those customers may be spread over a large geographic area, the CMS 120 may cast a wider sub-network for those devices to ensure a large enough population size.

In some embodiments, the swarm analyzer 130 generates swarm-agreed configurations 245 for some or all of the device swarms 230. Each device swarm 230 can be fed to a swarm voting engine 240. The swarm voting engine 240 can analyze the various configuration states (e.g., from the configuration fingerprints 210) to determine the "correct" configuration for the device swarm 230. In some such embodiments, voting is used among the population of devices in the device swarm 230, whereby the networked devices 205 effectively offer their current configuration state as their candidate for the correct device configuration. It can be expected that most or all of the candidate configurations will match, and the matching configurations can thus become the swarm-agreed configuration 245 for the device swarm 230. Various implementations can use more complex voting techniques. For example, certain networked devices 205 can be assigned a higher weight in the voting because of certain device characteristics (e.g., the device is more recently installed or updated, the device is part of a network known to be more secure, etc.), and the voting is performed according to the unevenly weighted voting power of the networked devices 205. As another example, each candidate configuration state can be parsed into multiple partial configuration states, and voting can be performed on each partial configuration state to achieve the swarm-agreed configuration 245. Embodiments can store the swarm-agreed configurations 245 in the swarm data store 135 in association with their respective device swarms 230. For example, the swarm data store 135 can include a relational database, lookup table, or any other suitable data structure by which the swarm-agreed configurations 245 are associated with the device swarms 230.

Centralized self-healing of a particular networked device 205 (e.g., networked device 205a) can then proceed, for example, as described with reference to FIG. 1. Networked device 205a generates and sends a configuration fingerprint 210a to the swarm analyzer 130. The discriminator 220 can determine that the configuration fingerprint 210a is associated with a device (networked device 205a) belonging to a particular one of the device swarms 230 (e.g., device swarm 230a). As such, the swarm analyzer 130 can determine that the correct configuration state for the networked device 205a corresponds to the swarm-agreed configuration 245a stored in the swarm data store 135 in association with the particular device swarm 230a. An issue detection engine 250 of the swarm analyzer 130 can analyze the configuration fingerprint 210a against the swarm-agreed configuration 245a to detect whether there is a discrepancy. In one implementation, the configuration fingerprint 210a and the swarm-agreed configuration 245a can both be maintained as cryptographic hashes and can be compared (e.g., byte-wise) to detect any discrepancies. In another implementation, the configuration fingerprint 210a can be converted to a data type comparable with the swarm-agreed configuration 245a (e.g., by applying a reverse hash function to the configuration fingerprint 210a, decrypting the configuration fingerprint 210a, decoding the configuration fingerprint 210a, etc.), and comparing the comparable data types to detect any discrepancies. Responsive to the issue detection, one or more remedying processes can be directed by the self-healing subsystem 140. Such remedying can involve the self-healing subsystem 140 directing the networked device 205a to reboot, update, report, and/or perform other functions. In certain embodiments, the detection can pass through auditing by the auditing subsystem 150 (e.g., which may or may not involve communications with owner networks 160 via an owner interface subsystem 155) prior to, or in conjunction with, remedying by the self-healing subsystem 140.

Figure 3:
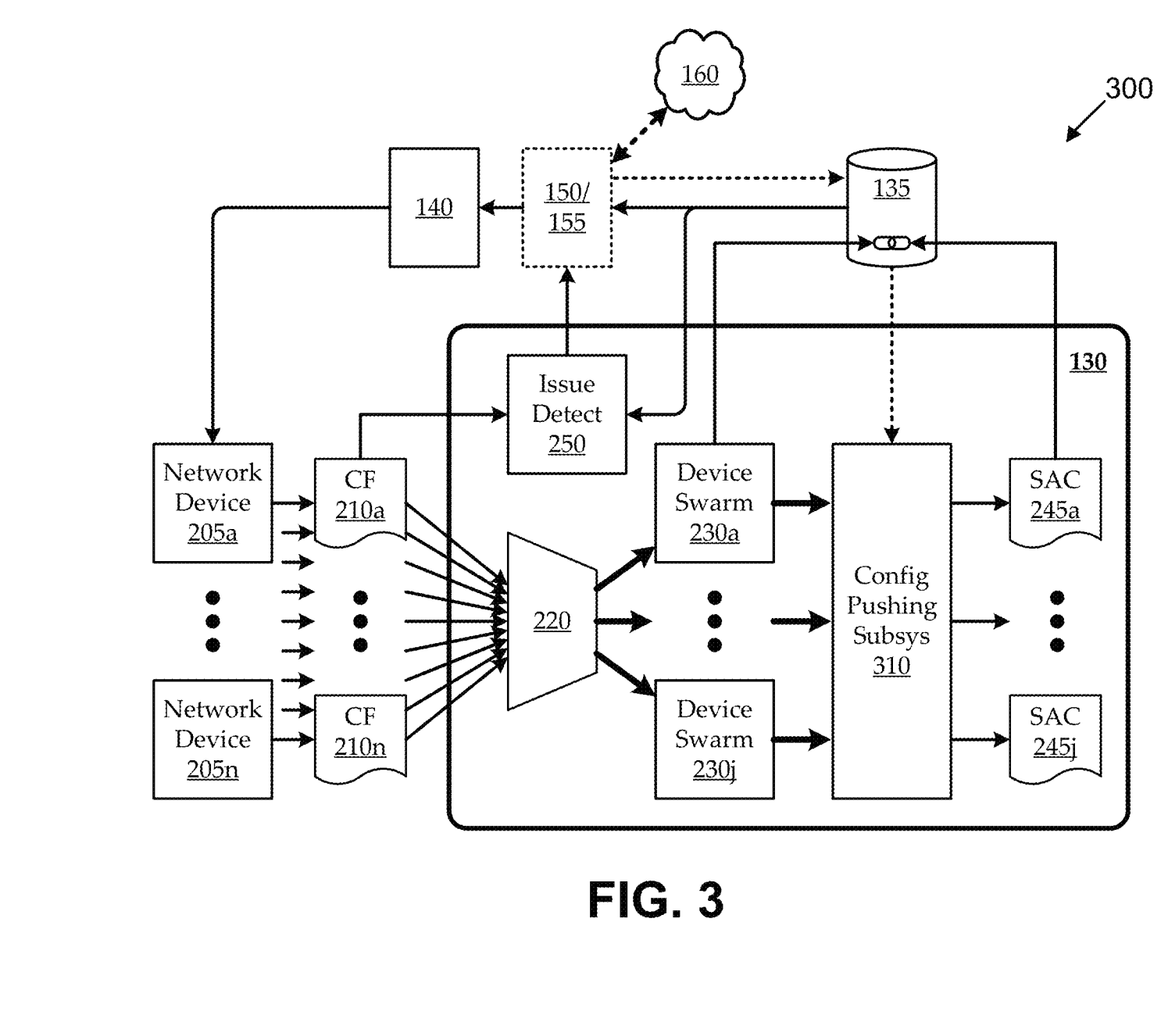
FIG. 3 shows another simplified partial communication environment to illustrate determination and use of device swarm configurations according to an asserted configuration approach, according to various embodiments.

FIG. 3 shows another simplified partial communication environment 300 to illustrate determination and use of device swarm configurations according to an asserted configuration approach, according to various embodiments. As in FIG. 2, a number of networked devices 205a-205n are in communication with a swarm analyzer 130. The networked devices 205 communicate configuration fingerprints 210 and/or other information (e.g., one or more device identifiers) to a discriminator 220 of the swarm analyzer 130. The discriminator 220 uses the received information to assign the networked devices 205 to device swarms 230. Rather than using voting to generate swarm-agreed configurations 245 in a dynamic manner, some or all swarm-agreed configurations 245 can be asserted for their associated device swarms 230 by associated device owners via a configuration pushing subsystem 310 of the swarm analyzer 130.

In some embodiments, device owners can push one or more device configurations to the swarm analyzer 130 via the owner networks 160 and owner interface subsystem 155. For example, suppose a device owner desires to populate a firmware fix to already-deployed networked devices 205 belonging to a particular device swarm 230. The fixed firmware can be asserted as the swarm-agreed configuration 245 for the particular device swarm 230. For example, the asserted swarm-agreed configurations 245 are communicated to the configuration pushing subsystem 310, which directs storage of the swarm-agreed configurations 245 as the correct configurations for the device swarms 230. Whenever a configuration fingerprint 210 is received for a device that is assigned to that device swarm 230 and has not yet been updated with the fixed firmware, the current configuration state indicated by the configuration fingerprint 210 will not match the asserted swarm-agreed configuration 245, causing detection of a configuration issue in the networked device 205.

Having stored swarm-agreed configurations 245 for the device swarms 230 (including asserted configurations) self-healing of a particular networked device 205 (e.g., networked device 205a) can then proceed. Networked device 205a generates and sends a configuration fingerprint 210a to the swarm analyzer 130. The discriminator 220 can determine that the configuration fingerprint 210a is associated with a device (networked device 205a) belonging to a particular one of the device swarms 230 (e.g., device swarm 230a). As such, the swarm analyzer 130 can determine that the correct configuration state for the networked device 205a corresponds to the swarm-agreed configuration 245a stored in the swarm data store 135 in association with the particular device swarm 230a. An issue detection engine 250 of the swarm analyzer 130 can analyze the configuration fingerprint 210a against the swarm-agreed configuration 245a to detect whether there is a discrepancy. Responsive to the issue detection, one or more remedying processes can be directed by the self-healing subsystem 140. Such remedying can involve the self-healing subsystem 140 directing the networked device 205a to reboot, update, report, and/or perform other functions. In certain embodiments, the detection can pass through auditing by the auditing subsystem 150 (e.g., which may or may not involve communications with owner networks 160 via an owner interface subsystem 155, not shown) prior to, or in conjunction with, remedying by the self-healing subsystem 140.

Though FIG. 2 is directed to voting for swarm-agreed configurations, and FIG. 3 is directed to asserting of swarm-agreed configurations, embodiments can use different approaches and/or can combine approaches. For example, a swarm-agreed configuration can initially be asserted by a device owner for a particular device swarm; then, over time, populations of devices assigned to the device swarm can vote for the swarm-agreed configuration to dynamic keep the correct configuration state updated. Similarly, a swarm-agreed configuration can initially be asserted by a device owner for a particular device swarm; then, over time, populations of devices assigned to the device swarm can vote for the swarm-agreed configuration to signal to the device owner a systemic configuration issue. For example, if enough devices have unintended configuration changes quickly enough to cause a change in the swarm-agreed configurations, this can signal a large-scale concern, and the device owner can be notified.

Figure 4:
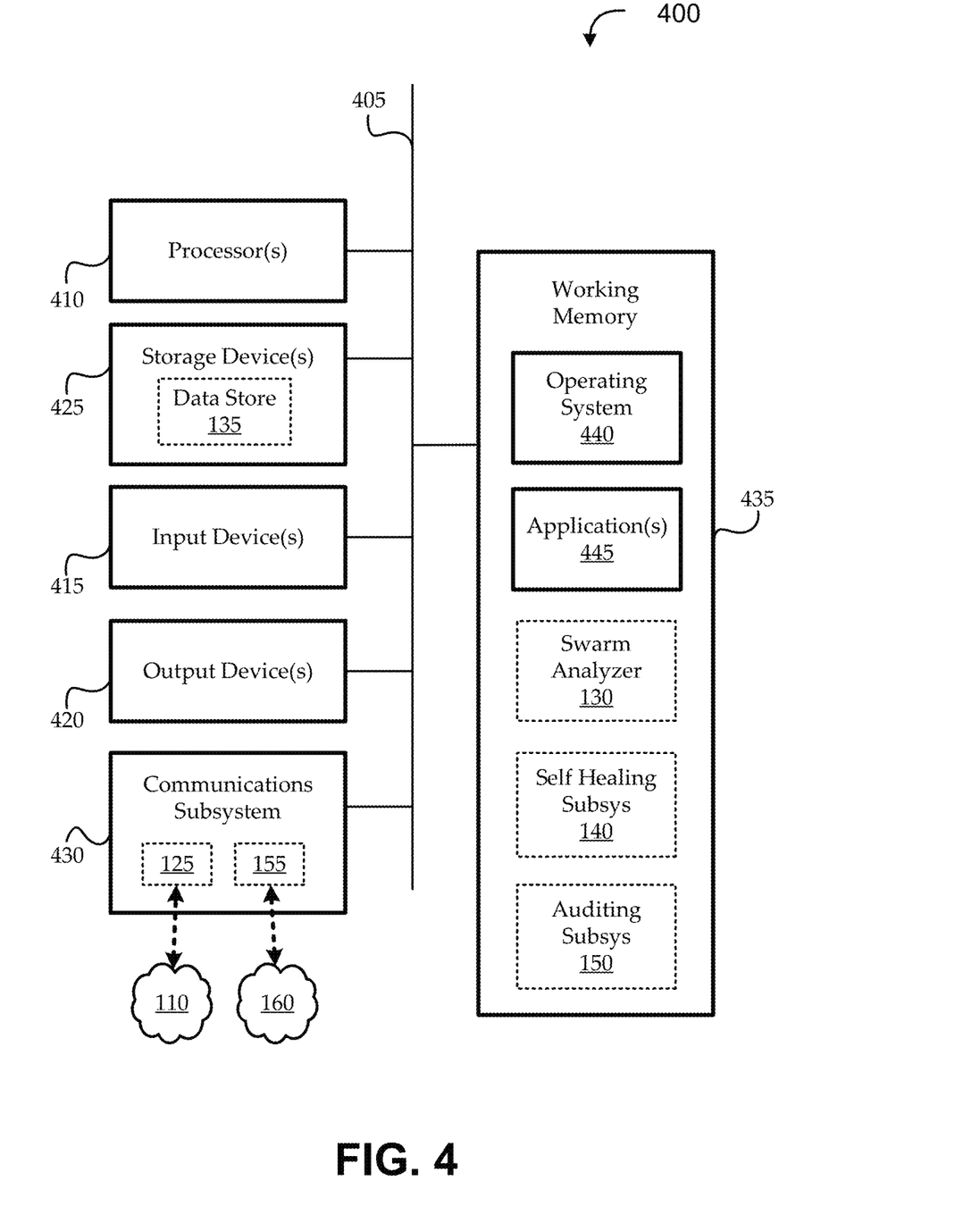
FIG. 4 provides a schematic illustration of one embodiment of a computer system that can implement various system components and/or perform various steps of methods provided by various embodiments.

Embodiments of the CMS 120, or components thereof, can be implemented on, and/or can incorporate, one or more computer systems, as illustrated in FIG. 4. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like. In some implementations, the computer system 400 is a server computer configured to interface with additional computers (not with human users), such that the input devices 415 and/or output devices 420 include various physical and/or logical interfaces (e.g., ports, etc.) to facilitate computer-to-computer interaction and control.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the swarm data store 135. For example, device swarm assignments, swarm-agreed configurations, and/or other suitable information is stored by the storage devices 425.

The computer system 400 can also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. In some embodiments, the communications subsystem 430 can include and/or implement the device interface subsystem 125 and/or the owner interface subsystem 155. For example, the communications subsystem 430 can be used to provide communications between the CMS 130 can the device network(s) 110 and/or owner network(s) 160.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the working memory 435 is used in conjunction with the one or more processors 410 to implement some or all of the swarm analyzer 130, the self-healing subsystem 140, and the auditing subsystem 150.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400.

The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
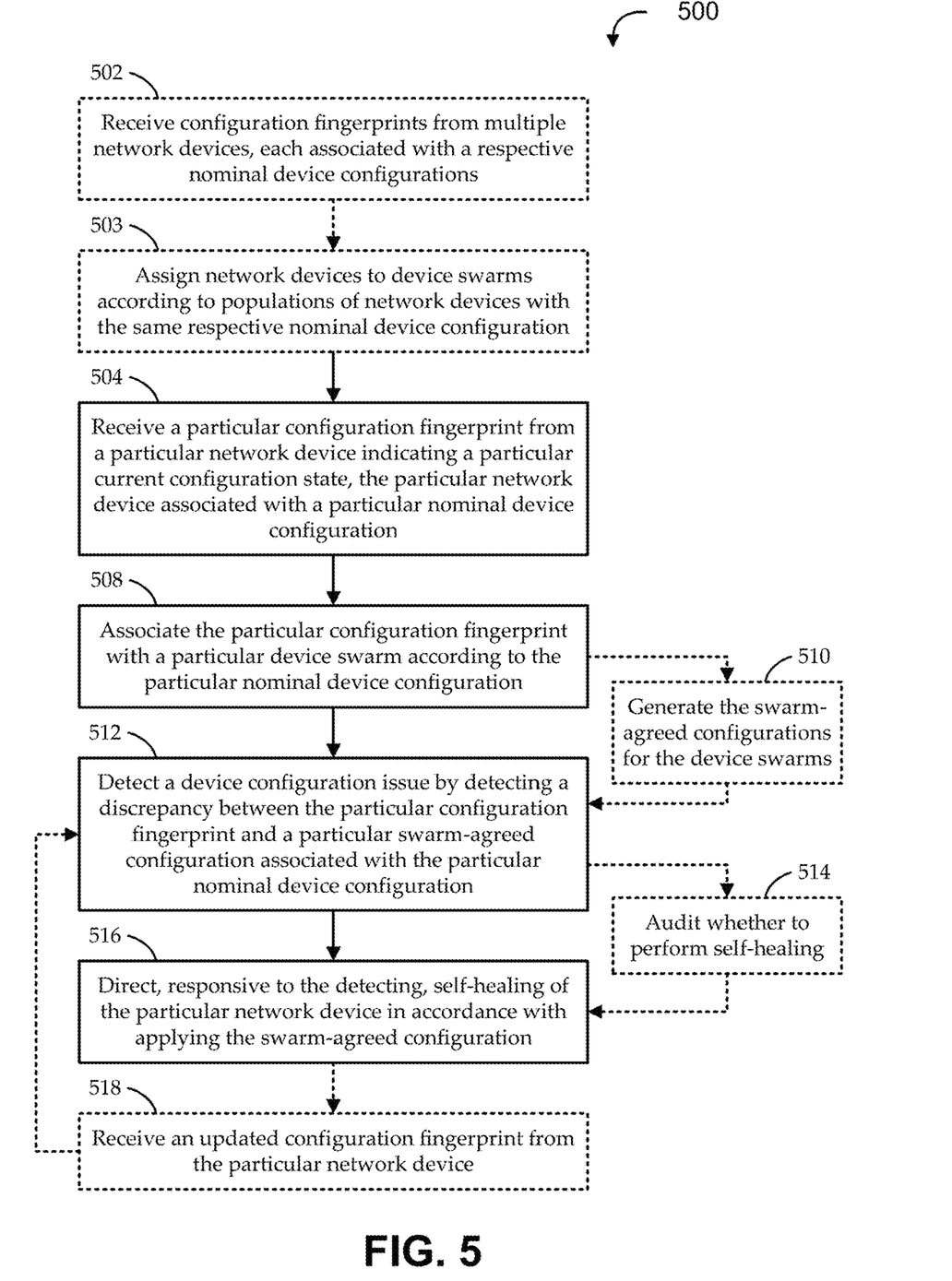
FIG. 5 shows a flow diagram of an illustrative method for centralized self-healing of networked devices, according to various embodiments.

Systems including those described above can be used to implement various methods. FIG. 5 shows a flow diagram of an illustrative method 500 for centralized self-healing of networked devices, according to various embodiments. Embodiments of the method 500 begin at stage 504 by receiving a particular configuration fingerprint (e.g., by a CMS) from a particular networked device of multiple networked devices via one or more communication networks. The particular configuration fingerprint indicates a particular current configuration state for the particular networked device, and the particular networked device is associated with a particular nominal device configuration. At stage 508, the method 500 can associate the particular configuration fingerprint with a particular device swarm of multiple device swarms according to the particular nominal device configuration. As described herein, each device swarm corresponds to a respective population of the networked devices determined to have a same respective nominal device configuration.

Some embodiments of the method 500 begin at stage 502 (e.g., prior to stage 504) by receiving configuration fingerprints (e.g., by the CMS) from the multiple networked devices via the one or more communication networks. In such embodiments, each of the networked devices can be associated with a respective nominal device configurations. In such embodiments, at stage 503, the method 500 can assign each networked device to a respective one of multiple device swarms determined to correspond to the respective population of the networked devices having the same respective nominal device configuration matching the one of the respective nominal device configurations associated with the networked device.

At stage 512, embodiments can detect a device configuration issue by detecting a discrepancy between the particular configuration fingerprint and a particular swarm-agreed configuration associated with the particular nominal device configuration. In some embodiments, prior to stage 512, the swarm-agreed configuration is generated at stage 510 by determining, for each device swarm, a respective swarm-agreed configuration associated with the same respective nominal device configuration for the device swarm. In such embodiments, the particular swarm-agreed configuration at stage 512 is the respective swarm-agreed configuration determined for the particular device swarm. In some implementations, the respective swarm-agreed configuration for each of some or all of the device swarms is generated at stage 510 based at least on applying swarm voting across the respective current configuration states indicated by a respective subset of the plurality of configuration fingerprints received from the respective population of the networked devices corresponding to the device swarm. In other implementations, the respective swarm-agreed configuration for each of some or all of the device swarms is generated at stage 510 based at least a pushed configuration asserted by a device (configuration) owner.

At stage 516, embodiments can direct, responsive to the detecting at stage 512, self-healing of the particular networked device in accordance with applying the swarm-agreed configuration. As described herein, such directing can involve forcing the networked device to reboot, directing the networked device to roll back to a previous configuration state, directing the networked device to update its configuration according to the swarm-agreed configuration, etc. In some embodiments, prior to (or in conjunction with) directing self-healing at stage 516, the method 500 can audit whether to perform the self-healing at stage 514. For example, embodiments can use state machines, machine learning, communications with device owners, and/or other techniques to determine whether the issue detected at stage 512 should be remedied at stage 516 (e.g., and/or how to remedy the issue, whether it is an issue at all, etc.). In some embodiments, remedying of the issue can involve further determination of whether the issue has been remedied. At stage 518, embodiments can receive an updated configuration fingerprint from the particular networked device. For example, after forcing a reboot of the particular networked device, or after directing the particular networked device to update its firmware, embodiments can direct the device to send a new configuration fingerprint. The new fingerprint can then be analyzed (e.g., according to stage 512 and/or stages 504 and 508) to once-again detect whether there is a configuration issue.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A centralized monitoring system (CMS) for self-healing of networked devices, the CMS comprising:
    a device interface subsystem to communicatively couple with a plurality of networked devices via one or more communication networks, the device interface subsystem configured to receive a particular configuration fingerprint by a centralized monitoring system (CMS) from a particular networked device of the plurality of networked devices, the particular configuration fingerprint indicating a particular current configuration state for the particular networked device, the particular networked device associated with a particular nominal device configuration;
    a swarm data store having, stored thereon in association with each of a plurality of device swarms, a respective population of the networked devices determined to have a same respective nominal device configuration associated with the device swarm, and a respective swarm-agreed configuration determined to be a correct configuration state for the same respective nominal device configuration associated with the device swarm;
    a swarm analyzer configured to:
        associate the particular configuration fingerprint with a particular device swarm of the plurality of device swarms according to matching the particular nominal device configuration to the respective nominal device configuration for the particular device swarm; and
        detect a device configuration issue by detecting a discrepancy between the particular current configuration state of the particular networked device and a particular swarm-agreed configuration being the respective swarm-agreed configuration associated with the particular device swarm; and
    a self-healing subsystem configured, responsive to the detecting the device configuration issue, to direct self-healing of the particular networked device in accordance with applying the particular swarm-agreed configuration.

2. The CMS of claim 1, wherein:
    the device interface subsystem is further configured to receive a plurality of configuration fingerprints from the plurality of networked devices via the one or more communication networks, each of the plurality of networked devices associated with one of a plurality of respective nominal device configurations; and
    the swarm analyzer is further configured to assign each networked device to a respective one of the device swarms by, for each of the plurality of networked devices, identifying one of the device swarms as associated with the same respective nominal device configuration that matches the one of the plurality of respective nominal device configurations associated with the networked device.

3. The CMS of claim 2, wherein:
- each of the plurality of configuration fingerprints is transmitted by a respective networked device of the plurality of networked devices and indicates a respective current configuration state for the respective networked device; and
- the swarm analyzer is further configured to generate the respective swarm-agreed configuration for each device swarm based at least on applying swarm voting across the respective current configuration states indicated by a respective subset of the plurality of configuration fingerprints received from the respective population of the networked devices corresponding to the device swarm.

4. The CMS of claim 1, wherein the swarm analyzer is further configured to:
- identify, for at least one of the device swarms, a configuration owner for the respective population of the networked devices; and
- generate the particular swarm-agreed configuration for the at least one of the device swarms based at least on a pushed configuration received by the CMS from the configuration owner.

5. The CMS of claim 1, wherein the swarm analyzer is further configured to:
- determine the respective population of the networked devices, for at least one of the device swarms, to correspond to a network geography sized to comprise at least a predetermined minimum number of the networked devices that have the same respective nominal device configuration.

6. The CMS of claim 1, wherein the swarm analyzer is further configured to:
- determine, responsive to the detecting the device configuration issue, whether the device configuration issue was previously addressed by the CMS in associated with the particular networked device,
- wherein the directing is performed only when it is determined that the device configuration issue was not previously addressed in association with the particular networked device.

7. The CMS of claim 1, wherein:
- the particular current configuration state of the particular networked device is defined according to current configuration code; and
- the self-healing subsystem is further configured to direct the self-healing by directing the particular networked device to replace the current configuration code with replacement configuration code generated according to the particular swarm-agreed configuration.

8. The CMS of claim 7, wherein the self-healing subsystem is further configured to:
- identify a configuration owner for the particular networked device;
- query the configuration owner for permission to self-heal the particular networked device; and
- direct the particular networked device to replace the current configuration code with the replacement configuration code only responsive to receiving the permission.

9. The CMS of claim 1, wherein the particular current configuration state of the particular networked device comprises at least a portion of current configuration code of the particular networked device, the current configuration code being at least a portion of current firmware data and/or current global config data of the particular networked device.

10. The CMS of claim 1, wherein the particular current configuration state of the particular networked device comprises a mathematical hash of at least a portion of current configuration code of the particular networked device, the current configuration code being at least a portion of current firmware data and/or current global config data of the particular networked device.

11. The CMS of claim 1, wherein the particular networked device is configured to transmit the particular configuration fingerprint periodically to the CMS.

12. The CMS of claim 1, wherein each of the plurality of networked devices is one of a baseband unit, an edge computing node, or an Internet-of-Things end device.

13. A method for centralized self-healing of networked devices, the method comprising:
- receiving a particular configuration fingerprint by a centralized monitoring system (CMS) from a particular networked device of a plurality of networked devices in communication with the CMS via one or more communication networks, the particular configuration fingerprint indicating a particular current configuration state for the particular networked device, the particular networked device associated with a particular nominal device configuration;
- associating the particular configuration fingerprint with a particular device swarm of a plurality of device swarms, the CMS having stored in association with each of the plurality of device swarms a respective population of the networked devices determined to have a same respective nominal device configuration associated with the device swarm, and a respective swarm-agreed configuration determined to be a correct configuration state for the same respective nominal device configuration associated with the device swarm, the associating the particular configuration fingerprint being according to matching the particular nominal device configuration to the respective nominal device configuration for the particular device swarm;
- detecting, by the CMS, a device configuration issue by detecting a discrepancy between the particular current configuration state of the particular networked device and the particular swarm-agreed configuration associated with the particular nominal device configuration, the swarm-agreed configuration generated by determining, for each device swarm, a respective swarm-agreed configuration associated with the same respective nominal device configuration for the particular device swarm, the particular swarm-agreed configuration being the respective swarm-agreed configuration determined for the particular device swarm; and
- directing, by the CMS responsive to the detecting the device configuration issue, self-healing of the particular networked device in accordance with applying the particular swarm-agreed configuration.

14. The method of claim 13, further comprising:
- receiving a plurality of configuration fingerprints by the CMS from the plurality of networked devices via the one or more communication networks, each of the plurality of networked devices associated with one of a plurality of respective nominal device configurations; and
- assigning each networked device to a respective one of the device swarms determined to correspond to the respective population of the networked devices having the same respective nominal device configuration matching the one of the plurality of respective nominal device configurations associated with the networked device.

15. The method of claim 14, wherein each of the plurality of configuration fingerprints is transmitted by a respective networked device of the plurality of networked devices and indicates a respective current configuration state for the respective networked device, and further comprising:
- generating, by the CMS, the respective swarm-agreed configuration for each device swarm based at least on applying swarm voting across the respective current configuration states indicated by a respective subset of the plurality of configuration fingerprints received from the respective population of the networked devices corresponding to the device swarm.

16. The method of claim 13, further comprising:
- identifying, for at least one of the device swarms, a configuration owner for the respective population of the networked devices; and
- generating the particular swarm-agreed configuration, by the CMS, based at least on a pushed configuration received by the CMS from the configuration owner.

17. The method of claim 13, further comprising:
- determining, responsive to the detecting, whether the device configuration issue was previously addressed by the CMS in association with the particular networked device, wherein the directing is performed only when it is determined that the device configuration issue was not previously addressed by the CMS in associated with the particular networked device.

18. The method of claim 13, wherein:
- the particular current configuration state of the particular networked device is defined according to current configuration code; and
- the directing the self-healing comprises directing the particular networked device to replace the current configuration code with replacement configuration code generated according to the particular swarm-agreed configuration.

19. The method of claim 13, wherein the directing the self-healing comprises directing the particular networked device to reboot and/or to roll back to an identified prior configuration state of the particular networked device.

20. The method of claim 19, further comprising, subsequent to the particular networked device rebooting and/or rolling back to the prior configuration state:
- receiving an updated configuration fingerprint from the particular networked device; and
- detecting, by the CMS, whether the device configuration issue persists by detecting whether the discrepancy persists between the swarm-agreed configuration of the particular one of the device swarms and the updated configuration fingerprint.

* * * * *